Sept. 8, 1953          J. R. ENGSTROM          2,651,195
APPARATUS FOR INDICATING VARIABLE CONDITIONS IN MACHINES
Filed Feb. 21, 1950
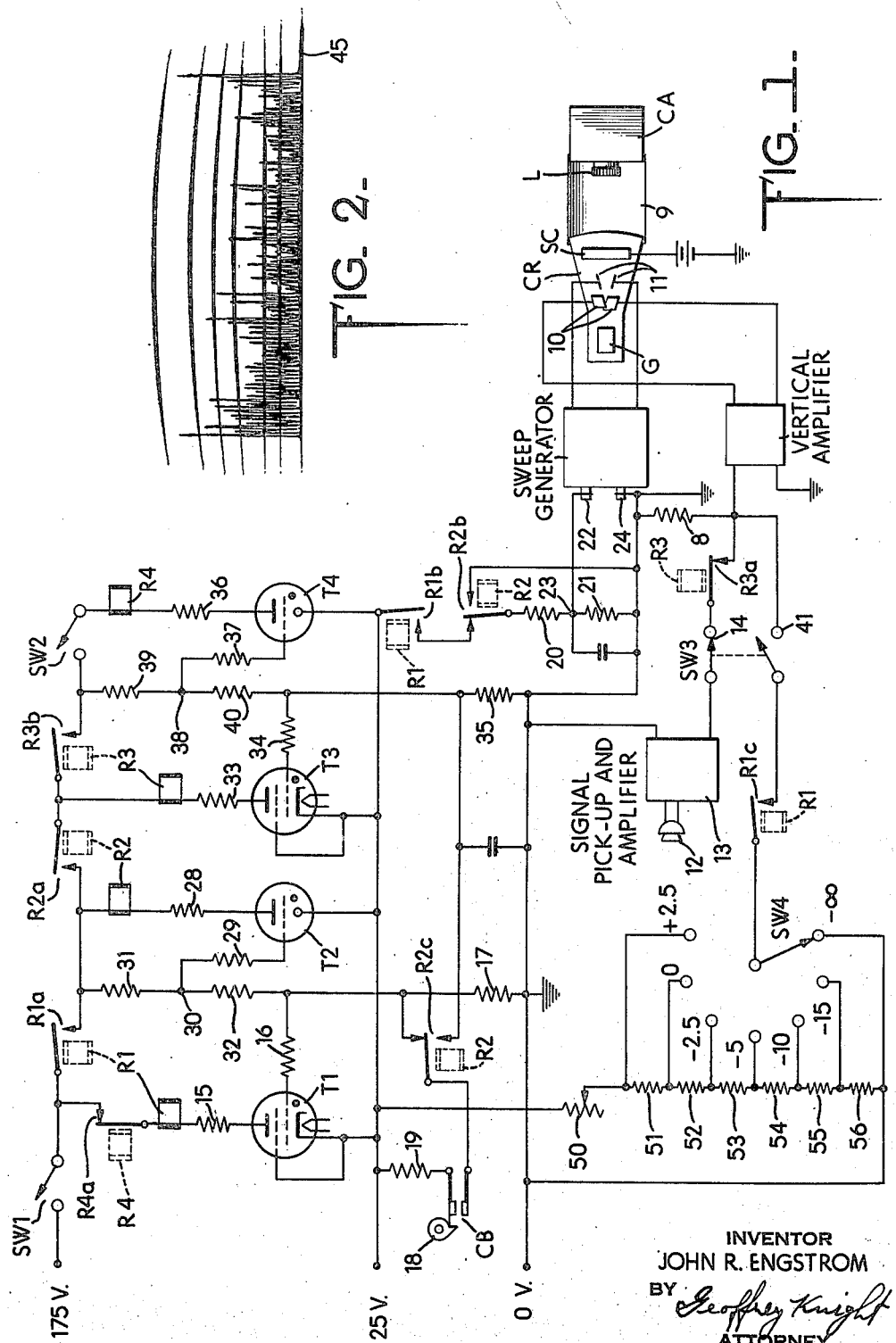
INVENTOR
JOHN R. ENGSTROM
BY Geoffrey Knight
ATTORNEY Patented Sept. 8, 1953

2,651,195

UNITED STATES PATENT OFFICE 2,651,195

APPARATUS FOR INDICATING VARIABLE CONDITIONS IN MACHINES

John R. Engstrom, Endicott, N. Y., assignor to International Business Machines Corporation, New York, N. Y., a corporation of New York Application February 21, 1950, Serial No. 145,542

4 Claims. (Cl. 73—69)

This invention relates to apparatus for manifesting a varying condition in a cyclically operating machine.

Apparatus in accordance with the invention has been used, for example, in studying the causes of noise in machines. In such a study it is helpful to know at what time or times in the cycle the noise reaches peak values. By relating this information to the timing chart of different parts of the machine which might cause noise, the principal sources of the noise emanating from the machine can be identified.

In a similar way varying strains can be manifested to show the intra-cyclical timing of their peak values.

It is, accordingly, an object of the invention to indicate the exact time or times in the cycle of a machine when a varying condition reaches peaks of amplitude.

It is a further object of the invention to provide an apparatus which will record a signal generated by a varying condition in a machine, for one full cycle and only one cycle.

A further object of the invention is to provide an apparatus as described in the preceding paragraph which can be made to produce a continuous indication of a varying condition under study.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a wiring diagram.

Fig. 2 is a drawing of a photograph of a noise signal recorded by the apparatus shown in Fig. 1. The invention will be explained by reference to an illustrative embodiment adapted for recording noise signals produced by machines. The signal is manifested by the trace of a cathode-ray tube CR having a gun G for directing a beam of electrons toward a screen SC. The beam is influenced by vertical deflecting plates 10 and horizontal deflecting plates 11. The cathode-ray tube is part of an oscillograph, such as the type 247 cathode-ray oscillograph of the Allen B. Du Mont Laboratories, Passaic, New Jersey. Some of the standard circuits of the oscillograph are used, as will be pointed out in the course of this description. When a signal is to be recorded, the screen of the cathode-ray tube is presented to a camera CA having a lens L. The camera is joined to the cathode-ray tube by a light-tight casing 9.

When a signal indication is about to be recorded the vertical deflecting plates are coupled to a microphone 12 and amplifier 13 through a ground connection on one side and, on the other side, through a normally closed pole 14 of switch SW3, normally closed contact R3a of a relay R3 and the Y-axis or vertical amplifier of the oscillograph, the signal voltage appearing across a resistor 8. The microphone is placed near the machine, in a position to receive the sound waves emanating from it. The deflection of the beam by the signal on the vertical plates is not noticeable at this time, because there is no horizontal sweep.

In accordance with the invention, means are provided to cause a horizontal sweep to be initiated at an exact point in the machine cycle and to cut off the signal to the vertical amplifier at the same point in the next cycle. The control means for initiating the sweep and terminating the signal comprises three circuits; namely, a starting relay circuit including a starting relay R1, a transfer relay circuit including a transfer relay R2, and a stop relay circuit including a stop relay R3. Each of the three circuits is controlled by a related tube T1, T2, and T3. The network is shown in the normal condition, ready for the initiation of a signal recording operation. A power supply (not shown) provides potentials 0, +25 and +175 volts. The cathodes of all three tubes are connected to +25 volts, while the anodes are normally disconnected from the power supply, but are subsequently connected to +175 volts, in a manner to be described.

The shutter of the camera CA being open, the recording operation is begun by closing a switch SW1, which connects the +175 volt terminal through a normally closed contact R4a, relay R1, voltage dropping resistor 15, to the anode of the tube T1. This is a heated-cathode gas tube, such as a type 2050, the heater circuit being omitted from the diagram. The tube does not conduct because a normal bias sufficient to keep it non-conductive is applied to its control grid through a grid resistor 16 and a resistor 17 connected to the zero-volt terminal.

The ignition of the tube T1 is caused by the closure of a contact CB operated by a cam 18 of the machine under test. This cam operated contact is one having a very short closure time, such as one or two degrees of the machine cycle. Normally, therefore, it will be open when the switch SW1 is closed, but because of the short closure time of the cam CB, in relation to the whole machine cycle, it makes no difference to the test whether it is open or closed at this time. Assuming the contact CB to have been open when SW1 was closed, the closure of contact CB extends a circuit from the +25 volt terminal through a resistor 19, contact CB, normally closed points R2c, and resistor 16, to the control grid of the tube T1. The control grid rises above the critical grid potential, causing the tube to be ignited. The relay R1 becomes energized and its contact R1b closes, completing a circuit from the +25 volt terminal through R1b, normally closed contact R2b, and a voltage divider 20, 21, to the zero volt line. An intermediate point 23 of the voltage divider 20, 21 is connected to the "External Sync. Input Terminal" 22 of the oscillograph, while the zero-volt line is connected to a ground terminal 24 of the oscillograph. The "Synchronizing Selector Switch" (not shown) of the oscillograph is set to "Ext." (external synchronizing) position and the "Single Sweep Switch" (not shown) is set to "Single Sweep" position. A voltage rise at the intermediate point 23 when the contact R1b closes starts the sweep generator of the oscillograph. The resulting voltage wave impressed on the horizontal deflecting plates 11 causes the beam to sweep across the screen SC. The signal continues to be impressed on the vertical deflecting plates 10 during most of the horizontal sweep of the beam. The shutter of the camera being open, the trace is photographed.

Meanwhile, the contact R1a of relay R1 was closed when the relay was energized, extending the +175 volt connection through relay R2 and resistor 28 to the plate of tube T2. This is a cold cathode gas tube, such as a type OA4G. The starter anode of the tube T2 is connected through a resistor 29 to a point 30 on a voltage divider 31, 32. The lower end of this voltage divider is connected through normally closed contacts R2c and the contact CB and resistor 19 to the 25 volt line, with the result that the starter anode is approximately 54 volts positive with respect to the cathode. This is not a large enough voltage difference to strike an arc in the tube.

When the contact CB opens, the voltage rise across resistor 17 becomes effective to increase the voltage of the starter anode to approximately 115 volts, which starts conduction of the tube T2 and causes relay R2 to be energized.

The energization of relay R2, which occurs very shortly after the energization of relay R1, transfers contact R2b and thereby grounds the upper end of voltage divider 20, 21, preventing any further tripping of the sweep generator, so long as relay R2 remains energized.

Contact R2a extends a connection from the +175 volt terminal through relay R3 and resistor 33 to the anode of tube T3, which is a gas tube similar to the tube T1. This tube does not conduct, being cut off by the bias potential on its control grid. This grid is connected through grid resistor 34 and resistor 35 to the zero volt line and is therefore approximately 25 volts below the cathode potential of the tube T3.

Contact R2c transfers, preparing a circuit which is completed on the next closure of the contact CB. This occurs just one cycle later than its closure which started the horizontal sweep. The potential on the control grid of the tube T3 is thereby raised to a point which causes the tube to conduct and the relay R3 is energized. Contact R3a opens, cutting off the signal from the vertical deflecting plates of the oscillograph. Due to an adjustment of the oscillograph previously made, which will be described presently, the signal is cut off just before the end of the horizontal sweep. The camera records a picture such as the one shown in Fig. 2, showing a relatively high amplitude of noise waves beginning near the end of the machine cycle and running through the first part of the cycle. Another relatively high amplitude occurs about a third of the way through the cycle. The network remains unchanged until the switch SW1 is opened. The network remains unchanged until the switch SW1 is opened. When this occurs the tubes T1, T2, and T3 are extinguished and the relays R1, R2 and R3 deenergized.

In preparation for making a recording of a signal it is desirable to adjust the sweep rate so that the one cycle signal terminates just before the end of the sweep, leaving the short tail 45. Also, the width of the signal graph should be made as large as possible, within the effective field of the camera. The adjustments are preferably made while visually observing the screen and means are provided, in accordance with the invention, for changing the circuit network from single sequence to repetitive sequence operation.

For this purpose a restoring circuit is added to the network, comprising a relay R4 and a tube T4. The tube T4 is a cold cathode gas tube like the tube T2. Normally the restoring circuit is disabled by opening the switch SW2. When this switch is closed, the closure of contact R3b by the energization of relay R3 extends a connection from the +175 volt terminal through the switch SW2, relay R4, resistance 36 to the anode of the tube T4. The starter anode of the tube T4 is connected through a resistor 37 to a point 38 on a voltage divider 39, 40. At the time the contact R3b closes, the lower end of this voltage divider is connected through transferred contact R2c, cam contact CB, and resistor 19, to the 25 volt line, producing a potential on the starter anode of about 54 volts. The tube T4 remains non-conductive until the contact CB opens, when the resistor 35 becomes effective to raise the potential at the point 38, and hence at the starter anode, to about 115 volts. This strikes an arc in the tube T4 and the relay R4 is energized. Contact R4a opens, deenergizing the relay R1 and thus restoring the network to the normal condition. The relay R4 itself is deenergized by the opening of contact R1a and contact R4a closes. This restores plate voltage to the anode of the tube T1 and prepares it for ignition when the contact CB closes the next time. The sequence of operations is then repeated, with the result that on each alternate cycle of the machine the signal generated by the microphone 12 is manifested on the oscillograph screen and, with the camera removed, can be observed by the operator. By the well-known adjusting devices of the oscillograph the sweep frequency is made slightly lower than the cycle frequency of the machine, so that the signal trace terminates somewhat short of the end of the sweep. The X-gain switch is adjusted to spread the signal trace to approximately the full width of the camera screen.

Means are also provided to trace calibration lines on the film, by which to judge the amplitude of the signal peaks. In Fig. 2 the horizontal lines are calibration marks produced on the film by the light spot of the cathode-ray tube, by means of a circuit arrangement now to be described.

The switch SW3 is transferred, opening the first pole 14 and thereby cutting off the signal generator from the vertical deflecting plates of the cathode-ray tube. The second pole 41 of the switch SW3 connects the vertical amplifier positive input terminal to circuit means designed to impress substantially fixed potentials of adjustable value upon the vertical plates of the cathode-ray tube, during the period of one sweep. A voltage divider comprising resistances 50, 51, 52, 53, 54, 55 and 56 extends between the +25 and zero volt lines. The resistances are proportioned to correspond to different decibel values of signal, as represented by the values shown at the several contact spots of a rotary switch SW4. Thus the second spot at the top is assigned a value of zero decibels, the one at the upper right has the value of +2.5 decibels, and the descending spots on the left have the values, respectively, −2.5, −5, −10, −15 and −infinity.

The graph shown in Fig. 2 is calibrated by the single sweep method, switch SW2 being open. When the switch SW1 is closed and the cam contact CB closes, the tube T1 is ignited and the relay R1 energized. The arm of switch SW4 may be standing on the zero decibel spot, for example. The closure of contact R1c extends the potential available at this spot through the switch arm, contact R1c, pole 41 of switch SW3, to the vertical amplifier of the oscillograph. At the same instant the contact R1b closes, tripping the sweep generator. For the purpose of the calibrating operation the sweep rate is made very high. The D. C. voltage applied to the vertical amplifier input must ordinarily pass through a capacitative coupling and will therefore decay as the capacitor (not shown) is charged through an internal resistor in the vertical amplifier. However, by making the sweep rate very high the voltage across the vertical deflecting plates remains nearly constant for the duration of the sweep. The second line from the top is recorded and has no noticeable slope.

The relay R2 grounds the sweep generator input immediately after the sweep is started, preventing the start of a second sweep. The relay R3 is also energized, but no use is made of this relay during calibration operations.

The switch SW1 is now opened and the arm of the switch SW4 is shifted to another spot, say the +2.5 decibel spot. The switch SW1 is closed again and another horizontal line is photographed. This would be the uppermost line in Fig. 2.

In a similar manner the other calibration lines are photographed on the film. It will be noticed that the spacing between these lines is in a logarithmic ratio, corresponding to the decibel scale. The calibrating operation may either precede or follow the recording of the signal. When both operations have been done, it is possible to judge the amplitudes of the peaks of the signal wave in decibel ratios.

It is also possible to set the network for recurrent operation and to observe the position of the trace on the screen for locating the calibration lines with the desired spacing. With the switch SW2 closed and the arm of the switch SW4 on the zero decibel spot, for example, the trace can be observed on the screen of the oscillograph and the rheostat 50 adjusted to locate it at the desired elevation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for controlling an oscillograph having vertical deflecting terminals and a synchronizing terminal for the control of a single sweep generator, so as to manifest a varying condition in a cyclically operating machine having a cam contact closed for a small part of its cycle and open for the remainder of its cycle; characterized by a start relay circuit including a start relay and normally non-conductive switch means therefor controlled by said cam contact on closing; a transfer relay circuit including a switch closed by said start relay, a transfer relay, and switch means therefor controlled by said cam contact on opening; a stop relay circuit including a switch closed by said transfer relay, a stop relay and switch means therefor; switch means controlled by said transfer relay for switching said cam contact to control said stop relay switch means on closing a second time; a circuit including switch means controlled by said start relay for transmitting a start signal to said synchronizing terminal; signal generating means controlled by the varying condition to be manifested; and circuit means normally connecting said signal generating means to said vertical deflecting terminals and including circuit opening means controlled by said stop relay.

2. Apparatus as described in claim 1, wherein said circuit for transmitting a start signal to said synchronizing terminal includes circuit opening means controlled by said transfer relay.

3. Apparatus as described in claim 1, wherein said circuit for transmitting a start signal to said synchronizing terminal includes means controlled by said transfer relay for opening said last mentioned circuit and for grounding said synchronizing terminal.

4. Apparatus as described in claim 1, characterized by a restoring relay circuit including a switch closed by said stop relay, a restoring relay, and switching means therefor controlled by said cam contact on opening a second time, and means controlled by said restoring relay for restoring all of said circuit means to starting condition.

JOHN R. ENGSTROM.

References Cited in the file of this patent

UNITED STATES PATENTS

| Number | Name | Date |
| --- | --- | --- |
| 2,122,499 | Stocker | July 5, 1938 |
| 2,286,894 | Browne et al. | June 16, 1942 |
| 2,431,324 | Grieg | Nov. 25, 1947 |
| 2,434,264 | Edson | Jan. 13, 1948 |
| 2,448,363 | Firestone et al. | Aug. 31, 1948 |
| 2,464,393 | Heim | Mar. 15, 1949 |
| 2,480,837 | Busignies | Sept. 6, 1949 |
| 2,518,427 | Lindberg et al. | Aug. 8, 1950 |